Aug. 5, 1952 — W. S. HIGLEY ET AL — 2,606,214
METHOD OF REMOVING INHIBITORS FOR UREA ADDUCT FORMATION
Filed Sept. 30, 1949
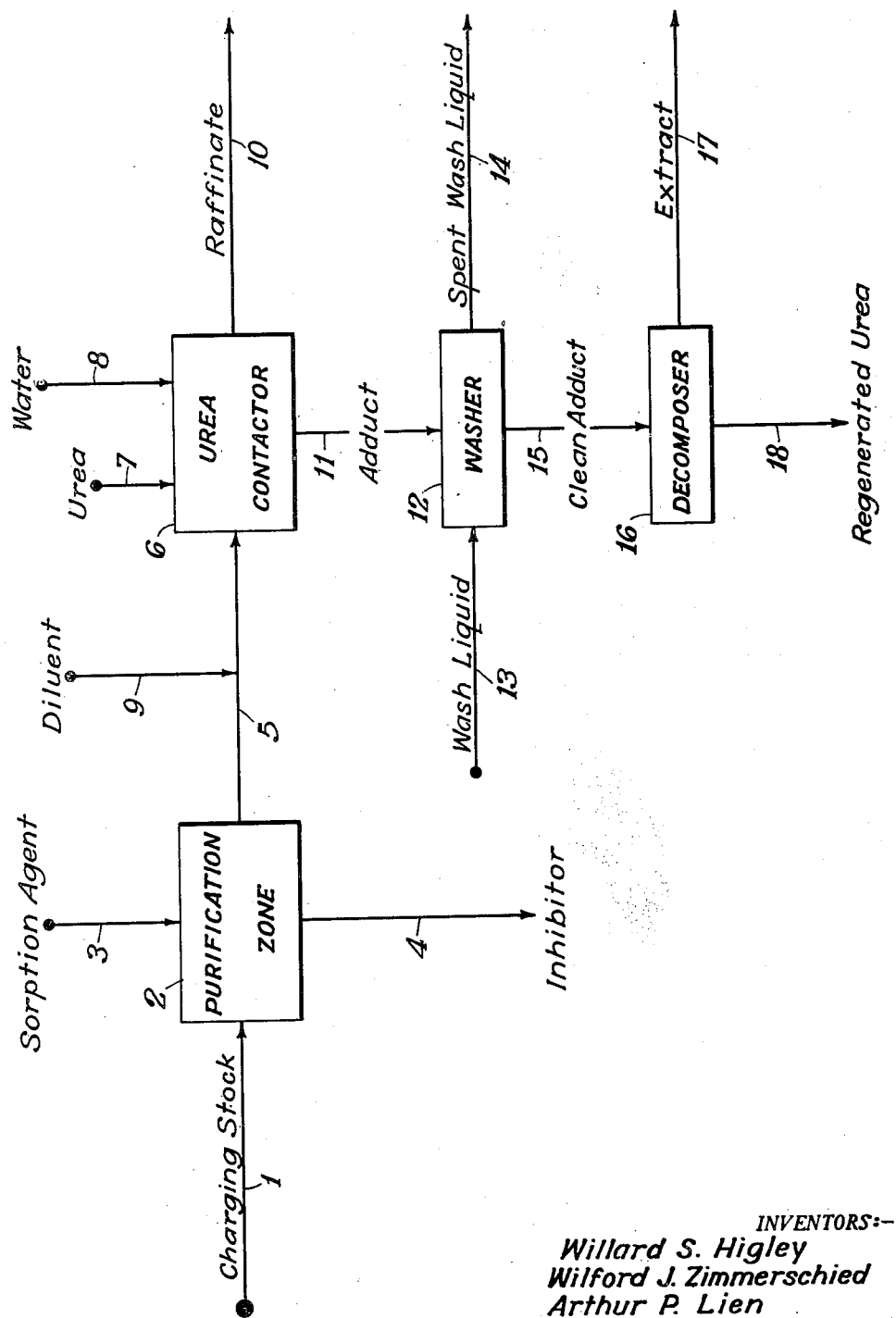
INVENTORS:—
Willard S. Higley
Wilford J. Zimmerschied
Arthur P. Lien
BY Everet F. Smith
PATENT AGENT Patented Aug. 5, 1952

2,606,214

UNITED STATES PATENT OFFICE 2,606,214

METHOD OF REMOVING INHIBITORS FOR UREA ADDUCT FORMATION

Willard S. Higley, Wilford J. Zimmerschied, and Arthur P. Lien, Hammond, Ind., assignors to Standard Oil Company, Chicago, Ill., a corporation of Indiana Application September 30, 1949, Serial No. 118,983

5 Claims. (Cl. 260—676)

Our invention relates to the separation of organic compounds. More particularly, it relates to an improvement in the process for recovering organic compounds which form solid adducts with urea from mixtures thereof with organic compounds which do not form such adducts.

It is now well known that urea forms crystalline adducts with various organic compounds, including certain straight-chain and mono-methyl-branched organic compounds, but not with other branched-chain compounds or cyclic compounds. This reaction has been successfully employed as a means for separating such adduct-forming compounds from mixtures with other organic compounds.

We have now discovered that various substances retard or altogether repress the reaction between the aforesaid classes of organic compounds and urea to form solid adducts. Among such inhibitors are heteropolycyclic sulfur compounds, such as those contained in low concentration in West Texas virgin gas oil, Mid-Continent gas oil, and light catalytic cycle stock. We have further discovered that such inhibitors may conveniently and effectively be removed from a charging stock containing them by treating the charging stock with an adsorbent solid such as activated alumina or a strong mineral acid such as sulfuric acid.

One object of our invention is to promote the separation of urea adduct-forming organic compounds from mixtures thereof with other organic compounds. Another object of our invention is to treat such mixtures to remove therefrom any constituents having a repressive action on urea adduct formation. A further object of our invention is to effect urea adduct formation under favorable conditions for substantially complete reaction between urea and urea adduct-forming organic compounds. Other objects of our invention and its advantages over the prior art will be apparent from the following description and examples.

According to the prior art, the formation of urea adducts is greatly accelerated by the presence within the reaction zone of a urea solvent, such as water or a lower aliphatic alcohol. We have confirmed this observation, and have in general chosen to use water, since it is cheap and readily available, and it neither contaminates the resulting extract nor gives rise to a recovery problem. However, during the course of our work on the formation of urea adducts, we discovered that various charging stocks failed entirely to react with urea in the presence of water, despite the facts that they were known to contain compounds of the adduct-forming type, and were found to form adducts readily with urea in the presence of organic solvents for urea such as methanol, ethanol, acetone, acetaldehyde, ethylene glycol, and the like. Such organic solvents will hereinafter be referred to as "activators" for urea adduct formation, as distinguished from water. Subsequently, we found that these charging stocks contained small proportions of materials, referred to hereinafter as "inhibitors," capable of retarding or altogether repressing the desired reaction in the absence of an organic solvent for urea. These materials appear to be highly aromatic, sulfur-containing polycyclics, as illustrated below in Example I; and they have the uniform property of being removable by sorption on surface-active solids and in a certain class of strong inorganic acids, to be defined more fully hereinafter.

Our process is illustrated by the attached diagrammatic flow-sheet. A charging stock containing one or more urea-adduct-forming organic compounds, inhibitor, and one or more other organic compounds is introduced through line 1 into purification zone 2. The charging stock may be diluted if desired by incorporating therein a mobile organic liquid which is inert toward urea and the sorption agent, which is a solvent for the charging stock, and which is a non-solvent for urea. Within the purification zone, the charging stock is contacted with a suitable sorption agent, introduced through line 3. The inhibitor is removed from the charging stock by the sorption agent, and is ultimately rejected from the purification zone through line 4. The purified charging stock emerges through line 5 and is led into a urea contacting zone 6, where it is contacted with urea and a humdifying agent, preferably water, supplied respectively through lines 7 and 8. The charging stock may be diluted if desired with a mobile organic liquid as defined above, which may be introduced through line 9 into line 5 or directly into zone 6. Within zone 6, the urea forms solid adducts with the reactive constituents of the charging stock, leaving a raffinate substantially or completely depleted of such constituents. The raffinate is separated from the adduct by suitable means, for example by filtration through a screen-type insert in the bottom of the reaction zone, or by filtration in an externally situated filter unit, or by centrifugation; and the raffinate is thereafter withdrawn through line 10.

A solid urea adduct, comprising essentially urea and the adduct-forming constituents of the charging stock, is withdrawn from the urea contacting zone 6 through line 11 and is led into washer 12, where it is contacted with a mobile organic liquid introduced through line 13, said liquid being a solvent for the charging stock, a non-solvent for urea, and non-reactive with urea. Entrained and occluded charging stock is removed thereby through line 14, leaving a clean adduct. The clean adduct emerges through line 15 into decomposing zone 16, where the adducted organic material is released and withdrawn through line 17. The regenerated urea emerges through line 18, and may be recycled.

The charging stock may be any organic liquid which is substantially a non-solvent for urea, which contains an inhibitor for urea adduct formation, and which contains at least one constituent that normally forms a solid adduct when contacted with urea in the absence of inhibitors for adduct formation. Such charging stocks include crude petroleum and petroleum fractions broadly, such as West Texas virgin gas oil, Mid-Continent gas oil, light catalytic cycle stock, and the like, all of which contain inhibitors of the defined class.

Removal of the inhibitor from the charging stock is readily effected by contacting the charging stock with a sorption agent, such as a surface-active solid, for example silica gel, activated alumina, silica-alumina, silica-magnesia, charcoal, bone black, activated carbon, bauxite, magnesium silicate, kieselguhr, infusorial earth, diatomaceous earth, various clays such as fuller's earth and bentonite which contain primarily aluminum silicates, and the like, or such as a strong inorganic acid having a proton-donating ability at least as great as aqueous 90 weight-percent sulfuric acid. (See L. P. Hammett, Chemical Reviews, 16, 67 (1935). Among such acids are sulfuric acid, hydrogen fluoride, mixed hydrogen fluoride-boron trifluoride, mixed hydrogen chloride-aluminum chloride, and the like. These acids are preferably used in substantially anhydrous form, but may contain up to around 10 weight-percent of water.

Conventional means may be employed for effecting contact between the charging stock and the sorption agent. Where, for example, a solid sorption agent is used, the solid may simply be slurried in the charging stock, and after a suitable period of contact, the solid may be separated by filtration, centrifugation, settling, or the like. Alternatively, the solid may be used as a fixed bed in a tower, and the charging stock may be passed therethrough, either upward or downward; or the solid may be used in the form of a moving bed, with the charging stock moving in either countercurrent or parallel flow. When employing solid sorption agents, we prefer to operate at autogenous pressures and at somewhat elevated temperatures, for example from about 50 to 200° C., optimally between about 75 and 150° C., depending somewhat on the nature of the solid sorption agent. Clays, for example, ordinarily require somewhat higher temperatures than charcoals or activated carbons.

When employing strong inorganic acid sorption agents, any of the conventional liquid-liquid extraction techniques are suitable for effecting contact between the charging stock and the sorption agent. We may, for example, employ a tower countercurrent extractor, a centrifugal countercurrent extractor, an orifice mixer, or a simple agitated vessel; and after a suitable contact time, the phases may be separated by decantation, centrifugation, or the like. When using strong inorganic acid sorption agents, we prefer to operate at lower temperatures, for example from about 0 to 40° C. or lower, in order to minimize extraction of components of the charging stock other than adduct inhibitors.

When a strong inorganic acid sorption agent is used, the resulting purified charging stock, after separation from the sorption agent, is preferably treated to remove any acidic materials retained therein by absorption, entrainment, or the like. This may conveniently be done by means of an alkali wash, for example with an aqueous solution containing from 5 to 10 percent of sodium hydroxide or other alkaline material. Thereafter, the alkali-washed material may be further washed with water to remove any remaining traces of alkali or salts. Alternatively, where the sorption agent is a normally volatile acid, any residual acidic material may be removed from the charging stock by stripping, for example under vacuum or with the aid of steam or an inert gas.

The reaction of urea with the purified charging stock is conveniently carried out by mixing solid urea, water, and purified charging stock and agitating the mixture for at least about 0.1 hour at a temperature between about 0 and 50° C., preferably 15 to 35° C. The proportion of water to urea in the absence of inhibitors is suitably between about 0.02 and 4 percent by weight, preferably between about 0.07 and 1.0 percent by weight. Subsequently, the slurry is filtered, centrifuged, or settled, in order to separate the adduct from the raffinate. Alternatively, the reaction may be carried out in a tower, through which the charging stock is passed in upflow or downflow through a stationary or moving bed of urea.

Suitable organic liquids for diluting the charging stock prior to the purification step, or prior to the urea-contacting step, and for washing the adduct emerging from the urea contacting step include aliphatic hydrocarbons in general having less than six carbon atoms in the molecule, such as butane and pentane; branched-chain organic compounds, such as isooctane, neohexane, and the like; and cyclic compounds, such as benzene, toluene, xylene, cyclohexane, methylcyclohexane, and the like.

In order to effect substantially complete reaction of urea with the urea adduct-forming constituents of the charging stock the minimum molar ratio of urea to adduct-forming constituents should be about $3n/4$, where $n$ is the average number of carbon atoms in the urea adduct-forming constituents. Higher ratios of urea may be used as a precautionary measure if desired, but are not in general necessary.

Decomposition of the washed urea adduct may be effected in a variety of ways. It may, for example, be contacted with a urea solvent, preferably water, or it may be heated above its melting point, and the liberated organic compound may be stratified and separated; or it may be distilled under vacuum. We prefer, however, to carry out the decomposition by contacting the adduct with an additional quantity of diluent or wash liquid at an elevated temperature above about 30° C. and below the melting point of the adduct, preferably between about 60 and 130° C., and optimally between about 100 and 120° C., as disclosed in the copending joint application of Wilford J. Zimmerschied and Arthur P. Lien, Serial No. 118,981, filed September 30, 1949 (now abandoned). The adducted organic materials are removed thereby into the solvent, leaving the urea in solid form suitable for being recycled.

Our invention will be more fully understood from the following specific examples.

*Example I*

Urea adduct-formation inhibitor was isolated by the following procedure from a West Texas virgin gas oil having the following properties:

| | |
|---|---|
| $n_D^{20}$ | 1.4820 |
| API gravity | 31.5 |
| ASTM distillation | 223–340° C. |
| Straight-chain components | 13.9 vol.-percent |
| Sulfur | 1.58 wt.-percent |

West Texas virgin gas oil (1600 ml.), urea (720 g.), methanol (50 ml.), and isopentane (500 ml.) were stirred together in a flask for one hour at around 30° C. From the resulting slurry Adduct I and Raffinate I were separated by filtration. The adduct was washed with isopentane and decomposed in warm water, yielding Extract I. Extract I was reacted with the same amount of urea and methanol to form Adduct II and Raffinate II. The adduct was washed and decomposed to give Extract II. When tested, Extract II failed to form an adduct with urea and water in the absence of an organic activator. This extract was passed through a 28-inch by $\tfrac{5}{16}$-inch glass column filled with silica gel, and the column was washed with isopentane. The adsorbed materials were eluted with methanol; and after being stripped, the methanol solution yielded 5.9 ml (0.37 vol.-percent based on the original gas oil) of inhibitor concentrate with the following physical properties:

| | |
|---|---|
| $n_D^{20}$ | 1.5610 |
| Sp. gr. $D_4^{20}$ | 1.024 |
| Sp. dispersion | 168 |
| Mol. wt. (B. P. method) | 201 |
| Sulfur | 6.08 wt.-percent |
| Carbon | 82.70% |
| Hydrogen | 9.23% |

Raffinates I and II were similarly treated with silica gel and the adsorbates were eluted and isolated. Thereafter, Raffinate I and the various silica-gel adsorbates were tested under comparable conditions for inhibiting properties on urea adduct formation. The following table lists the yields of each based on the original gas oil, and the proportions of each required to prevent reaction between urea, water, and inhibitor-free straight-chain paraffins derived from West Texas virgin gas oil:

| Fraction | Yield, Basis Original Gas Oil | Proportion Required to Inhibit Adduct Formation |
|---|---|---|
| | vol.-percent | vol.-percent |
| A. Raffinate I, from first urea treat | 76.5 | 5.0 |
| B. Silica gel adsorbate from Raffinate I | 12.7 | 3.5 |
| C. Silica gel adsorbate from Raffinate II | 2.1 | 2.8 |
| D. Silica gel adsorbate from Extract II | 0.37 | 0.87 |

*Example II*

A silica gel adsorbate from light catalytic cycle stock inhibited urea adduct formation when 1.1 volume-percent of the material was added to a silica gel-treated urea extract from West Texas virgin gas oil.

*Example III*

A mixture of West Texas virgin gas oil (50 ml.) and isopentane (50 ml.) was agitated 45 minutes at 30° C. with 150 g. of urea containing 0.03 weight-percent of water. No adduct was formed. The slurry was filtered and the treated liquid was found to have an index of refraction, $n_D^{20}$, of 1.4825, compared with 1.4822 for the untreated gas oil. The filter cake was dissolved in water, and it was observed that no organic layer separated therefrom.

West Texas virgin gas oil (50 ml.) diluted with isopentane (50 ml.) was passed downward through a 12-inch by ½-inch glass tube packed with silica gel at room temperature, and the effluent, stripped of isopentane, yielded 39 ml. of liquid having a refractive index of 1.4574, as compared with 1.4820 for the charging stock. The stripped effluent was agitated 45 minutes at 30° C. with 150 g. of urea containing 0.03 weight-percent of water. The resulting adduct was washed three times with isopentane, filtered, and decomposed with hot water. An organic phase was obtained having an index of refraction $n_D^{20}$ of 1.4438 and measuring 5.5 ml., corresponding to a 79 percent removal of the straight-chain paraffins present in the original gas oil.

*Example IV*

West Texas virgin gas oil (50 ml.) was heated with 12 g. of fresh Attapulgus clay for 10 minutes at 150° C. The treated gas oil, after separation of the clay, formed a solid adduct in copious quantities when contacted with urea and water, whereas the untreated gas oil failed to react with urea and water under the same conditions.

*Example V*

West Texas virgin gas oil (50 ml.) of the type used in Example IV was heated with 6 g. of coconut charcoal for approximately 10 minutes at 80° C. On separation of the charcoal, the effluent oil was found to form a solid adduct with urea in the presence of water.

*Example VI*

West Texas virgin gas oil (50 ml.) of the type used in Example IV was heated with 10 g. of activated alumina for 10 minutes at 150° C. After separation of the alumina, the effluent oil was found to form a solid adduct with urea.

*Example VII*

West Texas virgin gas oil, unreactive with urea and water, was treated at 38° C. for approximately 2 hours with 23 volume-percent of substantially anhydrous liquid hydrogen fluoride. The treated oil was found to have an index of refraction, $n_D^{20}$, of 1.4750, compared with an initial index of 1.4820.

The treated oil (1200 ml.) was passed upward through a tower reactor containing 6.42 gram-moles of urea of moisture content 0.03 weight-percent at the rate of 37.5 milliliters per mole of urea per hour. The urea adduct produced thereby was washed with 2 liters of cold isooctane, and was subsequently decomposed with 1.5 liters of isooctane at 98° C. The resulting isooctane solution was stripped free of isooctane, and an extract was obtained measuring 132 milliliters, corresponding to 68% of the straight-chain paraffins present in the charging stock.

While we have described our invention with reference to certain charging stocks, process materials, and manipulative procedures, it is to be understood that we are not limited thereto, but may practice our invention broadly within the terms of the present disclosure. In general, it may be said that any modifications or equivalents that would occur to those skilled in the art are to be considered as lying within the scope of our invention.

In accordance with the foregoing description, we claim as our invention:

1. A process for separating straight-chain hydrocarbons from a petroleum fraction of gas-oil boiling range comprising straight-chain hydrocarbons, non-straight-chain hydrocarbons, and an inhibitor for urea-adduct formation, said inhibitor being an aromatic polycyclic sulfur compound, which process comprises contacting said fraction with a sorption agent selected from the group consisting of adsorbent solids and strong inorganic acids having a proton-donating ability at least as great as aqueous 90 weight-percent sulfuric acid, whereby said inhibitor is removed therefrom, contacting the resulting purified fraction with urea under urea adduct-forming conditions in the presence of water as the urea solvent, withdrawing an adduct of urea and straight-chain hydrocarbons, decomposing said adduct into urea and said straight-chain hydrocarbons, and withdrawing said straight-chain hydrocarbons in purified form.

2. The process of claim 1 wherein said inhibitor is a heteropolycyclic sulfur compound.

3. A process for separating straight-chain hydrocarbons from a petroleum fraction of gas-oil boiling range comprising straight-chain hydrocarbons, non-straight-chain hydrocarbons, and an inhibitor for urea-adduct formation, said inhibtor being an aromatic sulfur compound whereof a silica-gel concentrate has an index of refraction ($n_D^{20}$) around 1.56 and a sulfur content around 6 percent by weight, which process comprises contacting said fraction with a sorption agent selected from the group consisting of adsorbent solids and strong inorganic acids having a proton-donating ability at least as great as aqueous 90 weight-percent sulfuric acid, whereby said inhibitor is removed therefrom, contacting the resulting purified fraction with urea under urea adduct-forming conditions in the presence of water as the urea solvent, withdrawing an adduct of urea and straight-chain hydrocarbons, decomposing said adduct into urea and said straight-chain hydrocarbons, and withdrawing said straight-chain hydrocarbons in purified form.

4. A process for separating straight-chain hydrocarbons from a virgin gas oil containing an aromatic polycyclic sulfur compound, which comprises contacting said virgin gas oil with an adsorbent solid, whereby said sulfur compound is removed from said virgin gas oil, contacting the resulting purified gas oil with urea under urea adduct-forming conditions in the presence of water as the urea solvent, withdrawing an adduct of urea and straight-chain hydrocarbons, decomposing said adduct into urea and said straight-chain hydrocarbons, and wtihdrawing said straight-chain hydrocarbons in purified form.

5. A process for separating straight-chain hydrocarbons from a cycle stock obtained in the catalytic cracking of petroleum, said cycle stock containing an aromatic polycyclic sulfur compound, which comprises contacting said catalytic cycle stock with liquid, substantially anhydrous hydrogen fluoride, whereby said sulfur compound is removed for said cycle stock, contacting the resulting purified cycle stock with urea under urea adduct-forming conditions in the presence of water as the urea solvent, withdrawing an adduct of urea and straight-chain hydrocarbons, decomposing said adduct into urea and said straight-chain hydrocarbons, and withdrawing said straight-chain hydrocarbons in purified form.

WILLARD S. HIGLEY.
WILFORD J. ZIMMERSCHIED.
ARTHUR P. LIEN.

REFERENCES CITED

The following references are of record in the file of this patent:

UNITED STATES PATENTS

| Number | Name | Date |
|---|---|---|
| 2,471,103 | Hill | May 24, 1949 |
| 2,479,238 | Holm et al. | Aug. 16, 1949 |
| 2,499,820 | Fetterly et al. | Mar. 7, 1950 |

OTHER REFERENCES

Zimmerschied et al., "Crystalline Adducts of Urea with Linear Aliphatic Compounds," paper presented before the Am. Chem. Soc., Atlantic City, N. J., Sept. 18–23, 1949, pp. 225–240.

Zimmerschied et al., "Ind. and Eng. Chem.," vol. 42, July 1950. (Received July 13, 1949, p. 1305.)